April 10, 1956  V. V. MASON ET AL  2,741,127
TEMPERATURE INDICATOR

Filed May 8, 1952  2 Sheets-Sheet 2

INVENTORS
V. V. MASON
C. F. BOOK

ATTY

United States Patent Office 2,741,127
Patented Apr. 10, 1956

2,741,127

TEMPERATURE INDICATOR

Valentine Victor Mason, Oakville, Ontario, and Clarence F. Book, Niagara Falls, Ontario, Canada, assignors to The Hydro Electric Power Commission of Ontario, Toronto, Ontario, Canada Application May 8, 1952, Serial No. 286,836

7 Claims. (Cl. 73—350)

This invention relates to temperature indicators, and more particularly to hot spot temperature indicators for transformers and the like, which indicators will accurately disclose the actual temperature of the hottest spot in the transformer windings.

An indicator which will accurately disclose the actual temperature of the hottest spot in an electrical device permits the device to be utilized to its fullest capacity without any risk that its temperature rating will be exceeded. The usual mode of determining whether a transformer or similar electrical device is being operated at or above its rated capacity is to maintain a more or less constant check upon the currents flowing in the conductors thereof and also upon the temperature of the coolant at or near the top of the unit. However, the temperature of the coolant (oil for example) will be considerably less than the temperature of the inner coils in the windings, where the circulation of the coolant is somewhat impeded. The temperature difference between the hottest spot in the coils and the temperature of the hot oil at the top of the transformer is a function of the current flowing in the windings of the transformer, and reaches a constant value determined by the construction of the windings and by the magnitude of the current. However, if current is suddenly applied to the windings, or if the current suddenly increases, the final difference between the temperature of the coils and the temperature of the oil is not reached immediately, but rather is approached asymptotically due to the thermal capacity of the copper in the coils. In other words, the ultimate temperature difference between the hottest spot in the coils and the temperature of the top oil is approached more or less exponentially, the rate of change of temperature difference with respect to time being great at first and after a period of time diminishing to virtually zero.

Thus it is seen that due to the thermal delay caused by the thermal capacity of the copper windings of a transformer, a current overload in the transformer, which, by the usual indicating methods such as current metering, would be considered dangerous to the life of the transformer, can be safely sustained by the transformer for short periods of time, since the actual hot spot temperature of the transformer might not necessarily exceed the value rated as maximum by the manufacturer. The excess heat which is generated due to the short-time overload is absorbed by the copper windings without causing material increase in the temperature thereof.

Transformers and other electrical devices frequently fail due to breakdown of their insulation. Operation of electrical devices at insulation temperatures in excess of certain values, which differ for different types of insulation, is known to result in very rapid deterioration and consequent early failure of the devices. Operation at very low temperatures, while not damaging to the equipment, is not economic because it requires an excessive amount of equipment and is not justifiable in times of electrical power shortage. It is therefore of the utmost importance that an accurate representation of the temperature of the hottest spot be always available to the operator, or that alarm and/or control equipment be operated automatically if excessive temperatures are reached.

Considerable work was done on this problem during the war years, both by the present inventors, for the Hydro Electric Power Commission of Ontario, and by German engineers, at a time when it was necessary to operate all transformer equipment at the highest possible loads consistent with substantially undiminished life. Both these independent efforts resulted in a device which operates by measuring the temperature of the top oil of a transformer in terms of an electrical quantity, and adding to this quantity a quantity of similar kind having a magnitude representative of the temperature rise of the transformer hot spot over the top oil.

In the case of the German device (which is described by the Field Information Agency, Technical, United States Group Control Council for Germany, in the F. I. A. T. Final Report No. 1155 under the title "Thermal Images for Transformers"), the electrical quantity determinative of the temperature of the top oil is the resistance of a first temperature-sensitive resistor mounted in a well in the top oil of the transformer, and the quantity representative of the temperature rise of the transformer hot spot over the top oil is a second temperature-sensitive resistor located outside the transformer and heated by a current proportional to the load current of the transformer. The German device has the disadvantage, amongst others, that the resistance of the second resistor depends upon the ambient temperature as well as upon the magnitude of the current intended to heat the resistor. Thus it is necessary to use a bridge circuit with a third temperature-sensitive resistor to compensate, at least partially, for changes in ambient temperature. This still gives an error which must be compensated for manually by the operator; the greater the variations in ambient temperature, the greater the errors in indicated hot spot temperature with the German device.

The apparatus developed by the present inventors accomplishes all that the German device accomplishes without resorting to manual adjustment to compensate for ambient temperatures, and the preferred embodiment hereinafter described is much more rugged and reliable and is capable of operating for long periods without maintenance. Further, apparatus constructed according to the present invention uses thermocouples which are normally supplied as standard equipment, in most power transformers of American manufacture, to measure the top oil temperature.

It will therefore be seen that an important object of the invention is to provide convenient and reliable means for accurately indicating hot spot temperature.

Another object of the invention is to provide a temperature-responsive device the thermal delay characteristic of which may be conveniently altered and adjusted over a wide range, in order that the device may be applied to different types and designs of transformers and other electrical devices such as generators, motors and cables.

The objects and advantages of the invention, as discussed above in general terms, are achieved by the means hereafter described, by way of example, in the following specification, taken in conjunction with the accompanying drawings, wherein like characters of reference indicate corresponding parts throughout the several views and wherein:

Fig. 1 is a schematic diagram showing a device constructed in accordance with this invention as it is used to indicate the actual hot spot temperature of a high voltage transformer;

Fig. 2 is a typical set of temperature vs. time curves illustrating how a voltage, representing the temperature difference between the hot spot in the windings of a transrmer and the temperature of the coolant at the top of the transformer, is added to a second voltage, representing the actual temperature of the hot oil, in order to produce a resultant voltage which represents the actual temperature of the hot spot in the windings;

Figure 1:
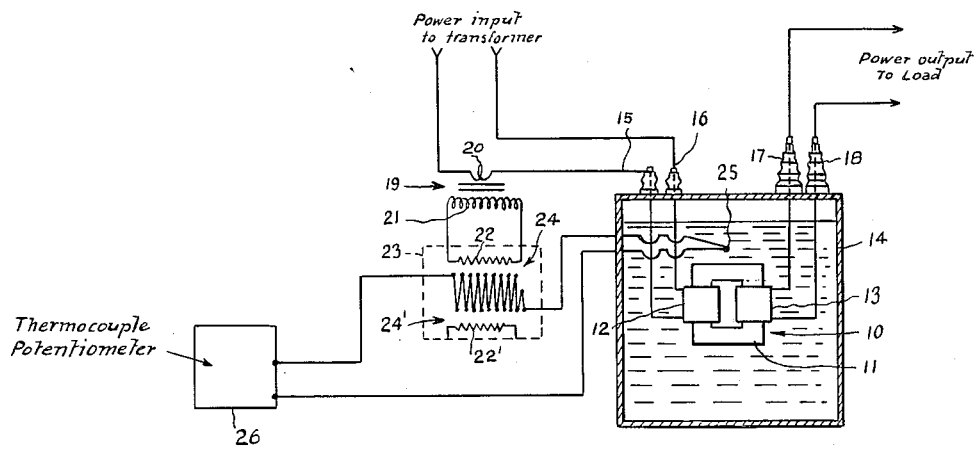

Referring to Fig. 1, a transformer, indicated generally as 10, comprises a core 11 on which are provided primary and secondary windings 12 and 13 respectively. The transformer has a casing 14 containing oil which acts as a coolant and insulator. Current flows in the primary winding 12 through terminals 15 and 16, and in the secondary winding 13, through terminals 17 and 18, to a load. A current transformer 19 has its primary winding 20 connected in series with the primary winding 12, and the secondary winding 21 of current transformer 19 is burdened by a heating element 22. The current owing in element 22 is proportional to the current flowing in the windings of transformer 10, and consequently the rate of heat production in element 22 is less than but proportional to the rate of heat production in the windings 12 and 13 of transformer 10 due to the resistances of those windings and the current flow therein.

Supported in a casing 23 of a thermocouple unit, or "thermal image," a preferred construction of which will subsequently be described in detail, is a plurality of thermocouples (a thermopile), of which the hot junctions are mounted in an assembly 24 which includes the heating element 22, and the cold junctions are mounted in an assembly 24' which includes an element 22'. Element 22' is identical in construction to element 22 but is not connected to any source of current. When element 22 is heated, a voltage is developed in the thermocouples, and that voltage is a function of the temperature difference between the bank of hot junctions and the bank of cold junctions.

As described subsequently, the mass and radiating surface of the assemblies 24, 24' may be adjusted so that the thermal delay in the rise of temperature difference between the hot and cold junctions due to an increase in current in element 22 is substantially the same as the thermal delay in the rise of the temperature of the transformer windings over the temperature of the oil. The rise in temperature of the hot junctions with respect to the cold junctions is proportional to the temperature rise of the transformer windings in relation to the surrounding oil, and the voltage produced by the thermopile is therefore proportional to the temperature difference between the windings and the oil. The hot and cold junction assemblies are mounted in the same ambient within the casing 23, and the assemblies are similarly constructed in order to have the same thermal characteristic, so that changes in ambient temperature do not affect the voltage produced by the thermopile.

A plurality of thermocouples are used in the thermal image because, firstly, a greater voltage can be produced for a given increase in temperature of heating element 22; secondly, a more nearly linear voltage to temperature relation is obtained; and, thirdly, the output of the heater 22 for normal load conditions is low, since the heater must be designed to carry heavy overload currents without failing in case of a short circuit in the power system.

The thermocouples in casing 23 are connected in series additive with a thermocouple having its hot junction 25 mounted in the top oil of the transformer. The voltage generated in the latter thermocouple represents the temperature of the top oil in the transformer. The resultant voltage from all the thermocouples is applied to a conventional thermocouple potentiometer 26 which has a conventional automatic cold junction compensator. An indication is therefore obtainable upon the thermocouple potentiometer which represents accurately the actual hot spot temperature of transformer 10.

Figure 2:
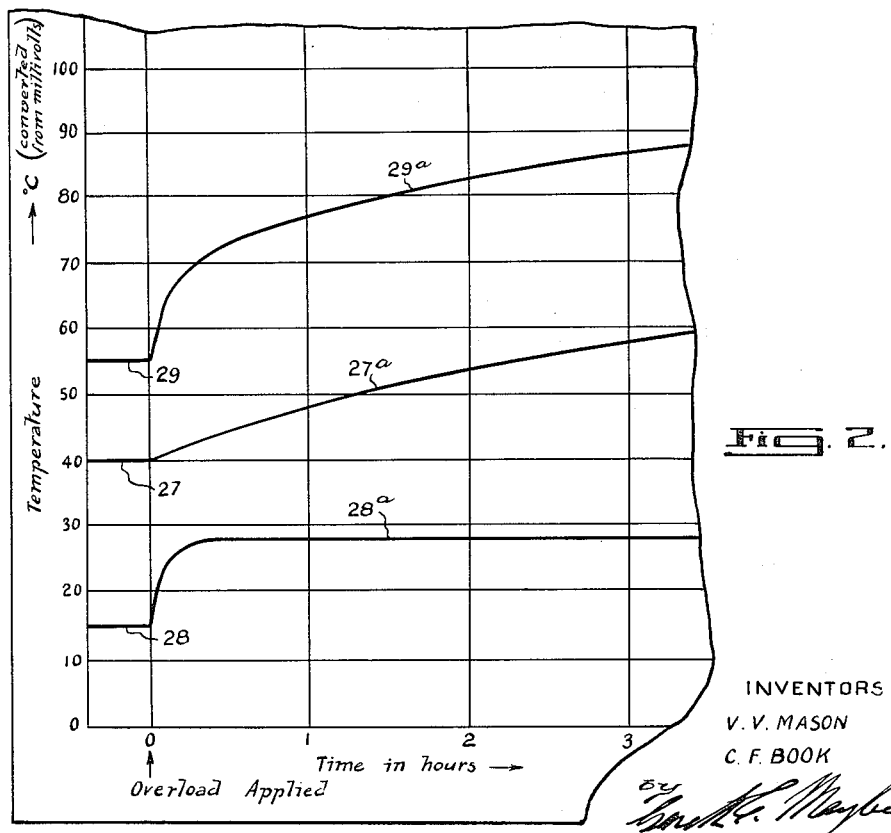

Referring to Fig. 2, it will be seen how the addition of the voltages produced by the thermocouples results in a voltage which represents the actual hot spot temperature of the transformer coils. The straight horizontal line 27 represents the temperature of the hot oil coolant in the transformer plotted as a Y-axis ordinate against time plotted as the X-axis abscissa. In this instance it will be seen that the actual temperature of the hot oil is 40° C. Line 27 is horizontal and straight because it is assumed that transformer 10 has been operating at constant load for a long period of time so that all temperatures therein have attained a stable steady-state condition. Line 28, which represents the number of centigrade degrees by which the temperature of the hottest spot in the windings exceeds the temperature of the hot oil, is also straight and horizontal, and in the example shown the temperature difference is 15° C. It is important to note however that this line 28 does not represent the actual temperature of the windings, but only represents the temperature of the hottest spot in the windings in centigrade degrees in excess of the temperature of the hot oil. Lines 27 and 28 are produced by plotting the voltage of the thermocouple in the top oil and the voltage of the thermocouples in the thermal image, both converted to degrees centigrade, on a horizontal time base, as described above, and since the thermocouples are connected in series additive the resultant voltage produced by all the thermocouples, including the thermocouple in the top oil, is the sum of the individual voltages and is represented by line 29. Thus, to a voltage representing an actual hot oil temperature of 40° C., a second voltage representing a temperature difference of 15° C. is added, to produce a resultant voltage which represents the actual hot spot temperature of 55° C.

Still referring to Fig. 2, if an overload is applied to the transformer at time $t=0$, the operating temperature of the transformer oil immediately begins to rise as indicated by curve $27^a$. Curve $27^a$ rises slowly because of the long time constant and the thermal capacity of the oil coolant and core assembly of the transformer 10. On the other hand, curve $28^a$ shows that the hot spot temperature rise of the transformer windings over the oil reaches a new maximum in a much shorter time and thereafter remains substantially constant. Curve $29^a$ is the summation of curves $27^a$ and $28^a$ and therefore represents the actual temperature of the hot spot in the windings.

As previously described, the thermocouple having its hot junction 25 located in the top oil of the transformer generates a voltage representing the curve $27^a$, and the thermopile in the casing 23 of the thermal image generates a voltage representing the curve $28^a$. A voltage representing the curve $29^a$ is therefore applied to the thermocouple potentiometer 26 so that at any moment after the application of the overload at time $t=0$ the operator can determine the actual temperature of the hot spot in the windings.

The mechanical features of the thermocouple unit or thermal image which enables the production of the voltage represented by curve $28^a$ will now be described in detail.

Figure 3:
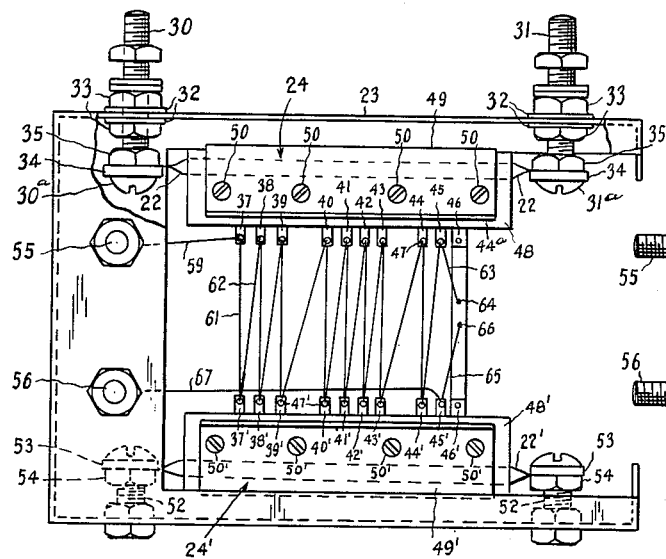
Fig. 3 is a partly broken away side elevation of a thermocouple unit, with its cover removed.
Figure 4:
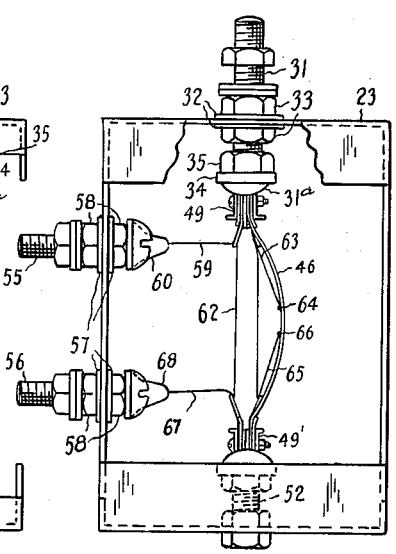
Fig. 4 is a partly broken away end elevation of the unit shown in Fig. 3 with the cover removed.

A U-shaped casing 23 provides a general mounting frame, and terminal bolts 30 and 31 are mounted on the casing 23 by insulating washers 32 and nuts 33, as shown in Figs. 3 and 4. The heating element 22, referred to above, is mounted on the heads 30a and 31a of bolts 30 and 31 by means of cup washers 34 and nuts 35. Heating element 22 is connected through the terminal bolts 30 and 31 to the secondary winding 21 (Fig. 1) of the current transformer 19.

Figure 5:
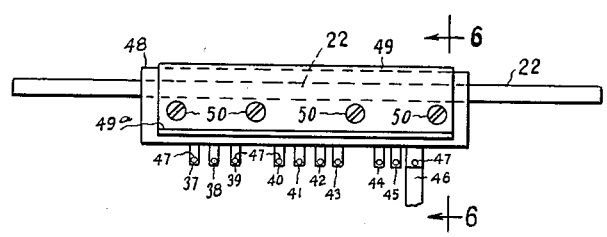
Fig. 5 is a side elevation of the hot junction assembly as it appears before being mounted in the thermocouple unit shown in Figs. 3 and 4.
Figure 6:
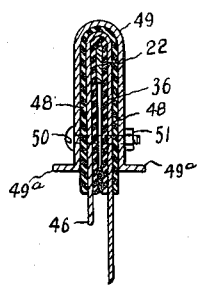
Fig. 6 is an enlarged section taken along line 6—6 in Fig. 5.
Figure 7:
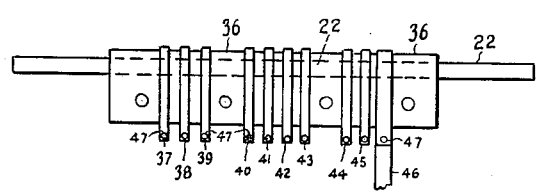
Fig. 7 is a side elevation of the hot junction assembly with its outer sheath and outer insulation removed.

The construction of the hot junction assembly 24 is best understood by reference to Figs. 5, 6, and 7. The heating element 22, which in a preferred construction is a ribbon of material such as nickel-chromium alloy, carries a sheet of insulating material 36 folded over it as shown in enlarged section in Fig. 6. A plurality of identical spaced apart hairpin shaped strips 37 to 45 inclusive extend around insulating sheet 36 as shown in Fig. 7, and it is these strips which form the hot junctions for the bank of thermocouples. The strips are made of a suitable thermally and electrically conductive metal such as copper. Along with strips 37 to 45 an additional strip 46 of somewhat heavier construction extends around the heating element 22 and insulation 36, but one end 46' of strip 46 extends downwardly into the cold junction assembly 24'. The construction of the cold junction assembly and the function of the strip 46 will be subsequently described in detail. Small holes 47 are provided in the ends of all the strips 37 to 46. A second sheet of insulating material 48 is wrapped over strips 37 to 46, as shown in Figs. 5 and 6, and the entire assembly is then enclosed within a metallic channel-shaped sheath or clamp 49. It will be seen that there is good thermal conductivity between the heating element 22, the strips 37 to 46, and the sheath 49. Comparatively wide spaces are provided between some of the strips 37 to 46 to provide clearance for bolts 50 extending through the assembly. These bolts are tightened by nuts 51 so as to lock the assembly in place, thereby providing a mechanically rigid construction. Referring to Fig. 6, it will be seen that flanges 49a are formed longitudinally along the sids of the sheath 49 so that the compressive forces exerted by bolts 50 will be more evenly distributed along the assembly.

The cold junction assembly, designated generally as 24', is constructed in substantially the same manner as assembly 24, the portions of the assembly which are exposed to view in Figures 3 and 4 being an element 22', cold junction strips 37' to 46' having holes 47' insulation 48', a sheath 49' and bolts 50'. The assembly 24' is mounted in casing 23 opposite the assembly 24, with the cold junction strips facing the hot junction strips. The element 22' is used merely for support and not for purposes of heating, and is secured to terminals 52 by cup washers 53 and nuts 54. Since no electrical energy is supplied to element 22, it is not necessary to insulate terminals 52 from the casing 23. When the assemblies 24 and 24' are mounted in casing 23, the ends of all junction strips are bent away from each other, as shown in Fig. 4, and strip 46 is arched from end to end.

Two terminals 55 and 56 are mounted on casing 23 and insulated therefrom by washers 57 held by nuts 58. A lead 59 of copper extends from a terminal lug 60 on terminal 55 to one end of the nearest hot junction strip 37, and the lead is soldered in the hole 47 in that end. A lead 61 of a different metal such as constantan is secured in the hole 47 in the other end of the strip 37 and extends across to one end of the corresponding strip 37' on the cold junction assembly 24'. A copper lead 62 is secured to the other end of strip 37' and extends across to strip 38 on the hot junction assembly 24. This sequence of alternate leads of constantan and copper, having their ends secured to hot and cold junction strips, continues in like manner until hot junction strip 45 is reached. At one end of this strip a constantan lead 63 is secured, and this lead extends to a point 64 on copper strip 46.

It will be evident that there is a temperature gradient along the strip 46 between the hot and cold junction assemblies, the gradient being a function of the temperature difference existing between the assemblies. Therefore, if a constantan lead 65 is connected to copper strip 46 at a point 66 which may be above or below the point 64, the resulting thermocouple formed will produce a voltage which will be additive or subtractive to the voltage produced by the thermojunctions at the strips 37, 37', 38 etc., depending upon whether the point 66 is closer to or farther from the hot junction assembly than is the point 64. It is simple to change the positions of thermojunctions 64 and 66 along strip 46, and thus to make a convenient fine adjustment of the voltage developed by the thermocouples. Rough adjustment is made by varying the number of thermocouples connected in series, and suitable taps may be provided for this purpose. The constantan lead 65 extends from point 66 to one end of strip 45' on the cold junction assembly and is there secured. A lead 67 of copper is secured to the other end of strip 45' and extends to terminal lug 68 on terminal 56.

It will be evident that if a temperature difference exists between the hot and cold junction assemblies, a voltage reflecting this temperature difference will appear between terminals 55 and 56.

The cooling effect of transformer oil goes down with decreasing temperature since the oil becomes more viscous. Copper-constantan thermocouples have a voltage-temperature characteristic which, because of its curvature, automatically takes into account such changes in the cooling effect of the oil due to changing ambient temperature; since the characteristic is less steep at lower temperatures, a given voltage output from the thermal image corresponds to a greater temperature increment for low oil temperatures than for high oil temperatures. Thus a reliable indication of hot spot temperature is always obtained.

The unit shown in Figs. 3 and 4 is enclosed by means of a cover which for the sake of clarity has not been shown. Thus, the air surrounding the hot and cold junctions of the thermocouples is enclosed, and its temperature rises due to the heat developed in element 22. It will be clear however, since both the hot and the cold junctions are mounted in the same ambient, and since the voltage developed by the thermocouples is a function merely of the temperature difference existing between the hot and cold junctions, that a rise or a fall of the temperature of the air surrounding both the hot and cold junctions in the unit, due to any cause whatever, does not affect the voltage developed by the thermocouples. The hot and cold junction assemblies are constructed to have the same thermal characteristic in order that both hot and cold junctions will be affected by the temperature of the ambient air to the same extent and in the same manner.

Figure 8:
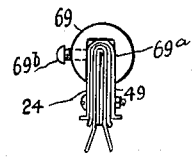
Fig. 8 is an end elevation of the hot junction assembly with a metal block mounted on the assembly to obtain desired mass and radiating surface.

The temperature rise vs. time characteristic of the hot junction assembly with respect to the cold junction assembly depends upon the rate at which the hot junction is heated when the current in element 22 is increased, and is therefore a function of the mass of the hot junction assembly and of the mechanical features of sheath 49 and thermally conductive strips 37 to 46, all of which radiate to the surrounding air the heat developed in heating element 22. In order that adjustments in the temperature rise vs. time characteristic may be easily made, a number of blocks of metal, of various sizes and shapes, are used. One such block, indicated as 69, is shown in Figure 8 in end elevation, the block being shown in position on the hot junction assembly 24. The block 69, as illustrated, is generally cylindrical and has a longitudinal slot 69a into which the sheath 49 fits, the block being clamped onto the sheath by means of screws 69b. If a block is clamped onto the hot junction assembly, a similar block is clamped onto e cold junction assembly to obtain the desired mass id radiating surface for each assembly. For instance, e temperature rise of the hot junctions over the cold nctions with respect to time may be delayed, so as to nulate the characteristic of a transformer with a larger inding time constant, by increasing the mass of the hot nction assembly and/or decreasing the heat radiating rface of the sheath and strips. Similarly, the temperature rise with respect to time may be made more pid, so as to simulate the temperature rise characteristic of a transformer having a smaller winding time constant, by decreasing the mass of the hot junction assembly and/or increasing its radiating surface.

As mentioned above, the voltage developed in the ermocouple unit or rise simulator for a given hot spot oil temperature difference in the transformer can be sily adjusted by suitably positioning thermojunctions 4 and 66. For coarse adjustment, suitable taps may 2 provided to vary the number of thermojunctions connected in the circuit.

The actual mechanical features of the device, as described, may be modified considerably without departing from the scope of this invention. Changes in the ze, shape and general mechanical arrangement of the ot and cold junction assemblies may be made without eparting from the spirit of this invention nor from the cope of the appended claims.

What we claim as our invention is:

1. Means for indicating the temperature of a current-arrying part of an electrical device comprising first iermoelectric means having a hot junction disposed in a non-current-carrying part of the electrical device, the rst thermoelectric means being adapted to produce a oltage which represents the temperature of said non-urrent-carrying part, a thermal image outside the electrical device and having a pair of assemblies of substantially identical physical structure so as to have the same iermal characteristic, the assemblies being located in paced apart relationship, one of the assemblies including a heating element and a hot junction of second thermoelectric means, the other assembly including a cold inction of the second thermoelectric means, means for upplying the heating element with electrical current which is proportional to the current flowing in the current-carrying part of the electrical device so that the rate if heat production by the element is proportional to he rate of heat production by said current-carrying art, the assemblies being spaced apart such a distance hat the second thermoelectric means is adapted to produce a voltage representing the difference between the emperature of the current-carrying part of the electrical levice and the temperature of the non-current-carrying art of the electrical device, the first and second thermo-lectric means being connected in series additive so that he sum of their voltages represents the temperature of he current-carrying part of the electrical device, and indicating means responsive to said sum.

2. Temperature indicating means as claimed in claim ., in which the assemblies of the thermal image are located in a common fluid ambient whereby the voltage roduced by the second thermoelectric means is substantially independent of variations in ambient temperature.

3. Temperature indicating means as claimed in claim l, in which a pair of masses substantially identical to each other are removably securable to the assemblies of he thermal image for obtaining variable delay in temperature rise of the hot junction over the temperature of the cold junction while maintaining the substantially dentical physical structure of the assemblies in order hat the voltage produced by the second thermoelectric neans will be substantially unaffected by variations in ambient temperature.

4. In combination, thermoelectric means comprising electrical conductors of different metals having at least one hot junction and at least one cold junction; a first assembly including the hot junction, a heating element, and electrical insulation between the heating element and the hot junction; a second assembly spaced from the first and including the cold junction, the second assembly having a physical structure substantially identical to the physical structure of the first assembly whereby the assemblies have the same thermal characteristic; the thermoelectric means including a thermally and electrically conductive element extending between the assemblies, the element thereby having a temperature gradient longitudinally thereof, the said element being arranged so that a thermojunction with an electrical conductor of different metal can be made at various points along its length.

5. In combination, a thermopile comprising electrical conductors of different metals having hot junctions and cold junctions which are series-connected by said electrical conductors, a support for the hot junctions comprising a linear heating element adapted to be supplied with electrical current and electrical insulation between the heating element and the hot junctions, a support for the cold junctions having a physical structure substantially identical to the physical structure of the support for the hot junctions whereby the supports have the same thermal characteristic, the thermopile including a strip of thermally and electrically conductive metal extending between the support for the hot junctions and the support for the cold junctions, the strip thereby having a temperature gradient longitudinally thereof, the said strip being arranged so that a thermojunction with an electrical conductor of different metal can be made at various points along its length.

6. The combination claimed in claim 5, in which the hot junctions comprise a plurality of thermally and electrically conductive strips spaced apart on the support for the hot junctions, and the cold junctions comprise a plurality of similar thermally and electrically conductive strips spaced apart on the support for the cold junctions, the electrical conductors of the thermopile being connected to said strips and extending between said supports.

7. In combination, a first assembly including an elongated heating element and a plurality of U-shaped thermally and electrically conductive strips embracing the heating element and electrically insulated therefrom, the strips being spaced apart along the length of the heating element; a second assembly spaced from the first and including another elongated element and U-shaped strips embracing said other element and spaced apart along its length, the second assembly having a physical structure substantially identical to the physical structure of the first assembly whereby the assemblies have the same thermal characteristic; and electrical conductors of different metals extending between the assemblies and connected to the U-shaped strips in series therewith forming a thermopile having hot junctions at the U-shaped strips of the first assembly and cold junctions at the U-shaped strips of the second assembly.

References Cited in the file of this patent

UNITED STATES PATENTS

| 1,862,763 | Nichols | June 14, 1932 |
| 2,305,396 | Volochine | Dec. 15, 1942 |
| 2,475,788 | Kidder | July 12, 1949 |
| 2,645,756 | Goodwin, Jr. | July 14, 1953 |

FOREIGN PATENTS

| 261,179 | Germany | June 18, 1913 |
| 170,728 | Great Britain | Nov. 3, 1921 |
| 265,519 | Great Britain | Feb. 17, 1927 |
| 320,193 | Great Britain | Oct. 10, 1929 |
| 582,016 | Germany | Aug. 7, 1933 |